(12) United States Patent
Kanzawa et al.

(10) Patent No.: US 7,802,272 B2
(45) Date of Patent: Sep. 21, 2010

(54) CHUCKING DEVICE, AND MOTOR AND DISC DRIVE DEVICE HAVING LOADED THEREON A CHUCKING DEVICE

(75) Inventors: Rentaro Kanzawa, Kyoto (JP); Takayuki Oe, Kyoto (JP); Yoshiki Okayama, Kyoto (JP)

(73) Assignee: Nidec Corporation, Kyoto (JP)

( * ) Notice: Subject to any disclaimer, the term of this patent is extended or adjusted under 35 U.S.C. 154(b) by 967 days.

(21) Appl. No.: 11/469,882

(22) Filed: Sep. 4, 2006

(65) Prior Publication Data

US 2008/0059984 A1 Mar. 6, 2008

(51) Int. Cl.
*G11B 17/028* (2006.01)

(52) U.S. Cl. .................. 720/707; 720/704; 720/709; 720/711

(58) Field of Classification Search .................. 720/704, 720/706, 707, 709, 711, 712, 714; 369/270.1
See application file for complete search history.

(56) References Cited

U.S. PATENT DOCUMENTS

| | | | | |
|---|---|---|---|---|
| 5,001,700 A | * | 3/1991 | Rowden et al. | 720/712 |
| 6,038,206 A | * | 3/2000 | Mukawa | 720/707 |
| 6,205,111 B1 | * | 3/2001 | Hayakawa | 720/707 |
| 6,532,205 B2 | * | 3/2003 | Sato et al. | 720/704 |
| 6,845,512 B2 | * | 1/2005 | Horng et al. | 720/707 |
| 7,313,801 B2 | * | 12/2007 | Choi et al. | 720/704 |
| 7,540,005 B2 | * | 5/2009 | Toyokawa et al. | 720/709 |
| 2003/0107984 A1 | * | 6/2003 | Yamaguchi | 369/270 |
| 2004/0205803 A1 | * | 10/2004 | Horng et al. | 720/707 |
| 2004/0216154 A1 | * | 10/2004 | Kim et al. | 720/707 |
| 2007/0067790 A1 | * | 3/2007 | Van Der Sanden et al. | 720/704 |
| 2008/0301726 A1 | * | 12/2008 | Loh | 720/704 |

FOREIGN PATENT DOCUMENTS

| | | | |
|---|---|---|---|
| JP | H10-106134 | | 4/1998 |
| JP | 10122251 A | * | 5/1998 |
| JP | 2000-113544 A | | 4/2000 |
| JP | 2004234773 A | * | 8/2004 |
| JP | 3690027 B2 | | 6/2005 |
| JP | 2006228327 A | * | 8/2006 |
| JP | 2006-252623 A | | 9/2006 |

* cited by examiner

*Primary Examiner*—William J Klimowicz
(74) *Attorney, Agent, or Firm*—Westerman, Hattori, Daniels & Adrian, LLP

(57) ABSTRACT

A chucking device comprises a retainer section for retaining a disc, a guiding section for guiding the disc to the retainer section, and a supporter for supporting the retainer section and the guiding section. The guiding section has a small enough angle for a guiding section side angle of inclination $\theta_1$ so as not to make contact with a upward facing disc, of a multilayer disc, thereby reducing a disc loading force.

21 Claims, 13 Drawing Sheets

CHUCKING DEVICE, AND MOTOR AND DISC DRIVE DEVICE HAVING LOADED THEREON A CHUCKING DEVICE

BACKGROUND OF THE INVENTION

1. Technical Field

The present invention relates to a chucking device operable to allow a disc, which is for storing and reproducing data, to be attached thereto and removed therefrom, and relates to a motor and to a disc drive device having loaded thereon the chucking device.

2. Description of the Related Art

Conventionally, a chucking device has been developed as means to allow a disc, which is for storing and reproducing data, to be attached thereto and removed therefrom, and to adjust (hereinafter referred to as align) a center of rotation of the disc to a rotation center of a motor. Further, there are expectations in which such chucking device becomes compatible with a high-density multilayer disc such as one illustrated in FIG. 11.

The multilayer disc 1 illustrated in FIG. 11 comprises two discs, 1a and 1b, pasted to one another using an adhesive. The discs 1a and 1b each are provided therein, for example, a 15 mm central opening space.

According to a technical standard: a maximum allowable internal diameter of the central opening space (e.g., 1a1 and 1b1, respectively) for each discs 1a and 1b are between 15.00 mm to 15.15 mm while a minimum allowable internal diameter of the 1a1 and 1b1 for the discs 1a and 1b after they are pasted to one another is 15.00 mm; and a maximum allowable misalignment between two discs after they are pasted to one another is, as illustrated in FIG. 12, 15.15 mm at the central opening space wherein the discs are misaligned from one another in opposite directions by, in total, 0.15 mm.

When the chucking device aligns the multilayer disc 1 comprised of 1a and 1b that are misaligned from one another by, in total, 0.15 mm at their central opening spaces with the chucking device, it is difficult for the chucking device to accurately align the multilayer disc 1 with the chucking device.

To this end, a chucking device (e.g., chucking device 2) as illustrated in FIG. 13 has been proposed. A structure of the chucking device 2, illustrated in FIG. 13, comprises a stator unit section 2a and a movable section 2b. The movable section 2b includes: a retainer section 2b1 for making contact with the disc 1b, which is a bottom half of the multilayer disc 1, so as to retain the multilayer disc 1; an inclined guiding section 2b2, which is adjacent to the retainer section 2b1; a contact prevention inclined section 2b3 for preventing the disc 1, which is a top half of the multilayer disc 1, from making contact with the chucking device; and a supporter section 2b4 for supporting the retainer section 2b1, the inclined guiding section 2b2 and the contact prevention inclined section 2b3.

Due to the chucking device 2 in which the movable section 2b makes contact solely with the disc 1b of the multilayer disc 1, an alignment between the multilayer disc 1 and the chucking device is to be executed based on the disc 1b.

However, due to the contact prevention inclined section 2b3, an angle generated by the inclined guiding section 2b2 and a rotation axis J1 will be forced to be large. Therefore, when the disc 1b makes contact with a radially inner side of the inclined guiding section 2b2, the movable section 2b will be forced to elastically bend its shape considerably outward in a radial manner so as to guide the multilayer disc 1 to the retainer section 2b1. Consequently, when loading the multilayer disc 1, a large force (e.g., a disc loading force) needs to be applied axially downward. As such, when the large disc loading force is required for loading a disc, there may be situations in which the disc is no fittingly loaded (e.g., clamp error) before a contact is made between the disc and the retainer section 2b1.

BRIEF SUMMARY OF THE INVENTION

According to a chucking device of the present invention, when loading a disc to a retainer section, since a guiding section, having an inclined surface so as to guide the disc to the retainer section, is provided axially above the retainer section of an aligning claw, which aligns the center of the rotation of the disc with the rotation center of the motor, it becomes possible to reduce a disc loading force, thereby preventing the clamp error.

When loading a multilayer disc on the chucking device, the guiding section of the aligning claw makes no contact with a disc that is pasted to a disc, of the multilayer disc, facing the loading section. Therefore, the aligning claw aligns the multilayer disc based on the disc facing the loading section.

Also, according to the chucking device of the present invention, a centering case section comprises an inclined guiding surface having an upper inclined guiding surface and a lower inclined guiding surface, wherein each surface have a different angle from one another. When the multilayer disc is loaded on the chucking device, the lower inclined guiding surface makes no contact with the disc pasted to the disc, of the multilayer disc, facing the loading section.

DETAILED DESCRIPTION OF THE INVENTION

Overall Structure of Brushless Motor

Figure 1:
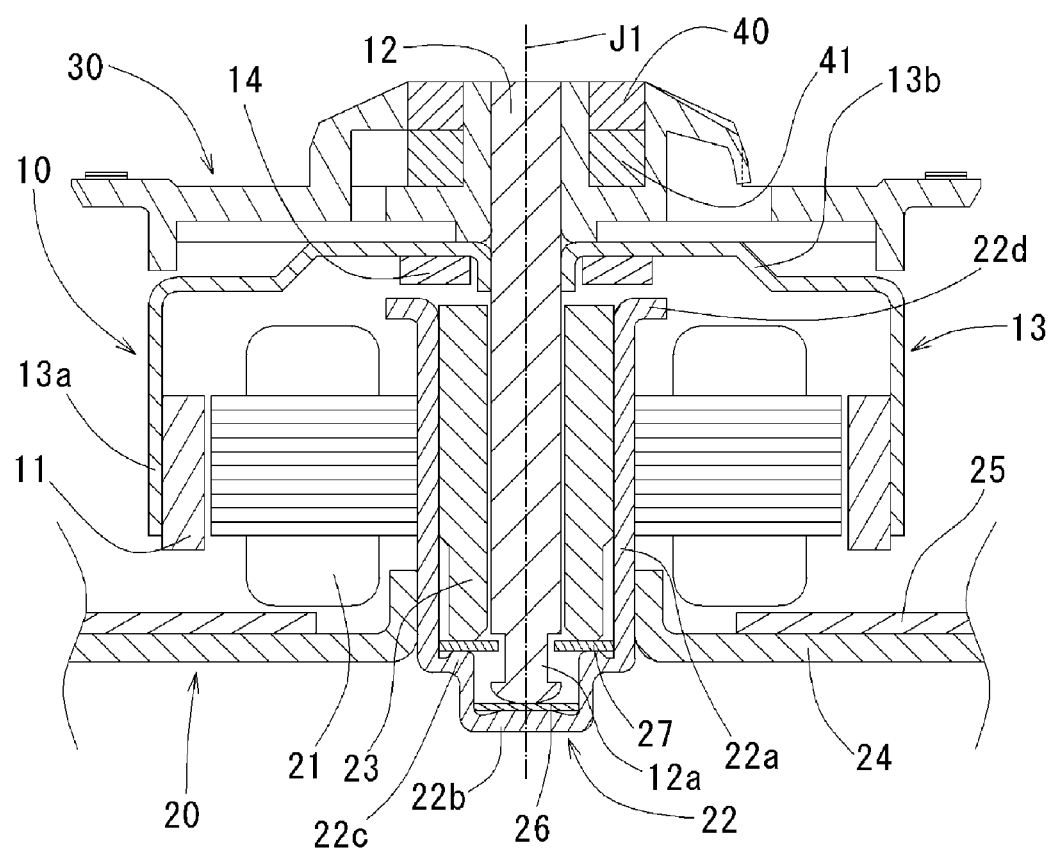
FIG. 1 is a diagram illustrating an exemplary cross section, with respect to a rotation axis, of an embodiment of a brushless motor of the present invention.

An entire structure of a brushless motor of the present invention will be described with reference to FIG. 1. FIG. 1 is a diagram illustrating an exemplary cross section, with respect to a rotation axis, of an embodiment of a brushless motor of the present invention.

According to FIG. 1, the brushless motor comprises: a rotor unit 10 including a rotor magnet 11; a stator 21 having a surface parallel to the rotor magnet 11 wherein there is a slight space in a radial direction between the stator and the rotor magnet 11; a stator unit section 20 for supporting the rotor unit 10; and a chucking device 30 for allowing a disc to be attached thereto and removed therefrom.

First, the rotator 10 will be described.

The rotator 10 includes: a shaft 12 which is a rotation axis J1; a rotor holder 13 which is a steel sheet pressed into a covered and substantially cylinder shape and is affixed to the shaft 12; a ring shaped rotor magnet 11 affixed to an interior surface of a cylinder section 13a of the rotor holder 13; and a ring shaped preload magnet 14 which is affixed to a downward facing surface of a cover section 13b of the rotor holder 13.

Next, the stator unit section 20 will be described.

The stator unit section 20 includes: a housing 22 which is a steel sheet pressed into a covered and substantially cylinder shape; a substantially cylinder shaped sleeve 23, affixed to an interior of the cylinder section 22a of the housing 22, for radially supporting the shaft 12 so as to allow the shaft 12 to rotate; a stator 21 affixed to a peripheral surface of the cylinder section 22a of the housing 22; a mounting board 24 affixed to a peripheral surface of the cylinder section 22a and is located axially toward a bottom part of the stator 21; a circuit board 25 affixed on a top surface of the mounting board 24; and a thrust plate 26, which is a thin plate, for axially supporting the shaft 12 so as to allow the shaft 12 to rotate and is located on a top surface of a base section 22b of the housing 22.

The sleeve 23 is formed by a lubricated sintering material. Also, toward a bottom of the cylinder 22a in the housing 22, a leveled section 22c, having a reduced circumference compared with the rest of the cylinder 22a, is formed. On an upper surface of the leveled section 22c, a ring shaped plate 27 is provided. The plate 27 is affixed by being sandwiched between the upper surface of the leveled 22c and a surface facing downward of the sleeve 23. Further, at a point of the shaft nearest to the plate 27, a reduced circumference section 12a is provided. An interior of the plate 27 is located radially near and facing an external circumference of the reduced circumference section 12a, and is located in such a manner that the inner surface of the plate 27 is nearer to a center of the shaft 12 than an external surface of the shaft 12 in areas other than the reduced circumference section 12a. Consequently, the plate 27 functions as a mechanism to prevent the shaft 12 from coming off the cylinder.

An extension section 22d, which extends radially outward, is provided at an upper end of the housing 22. The extension section 22d has its uppermost surface facing, without touching, the preload magnet 14. Due to an axially applied force of the preload magnet 14, rotation of the rotator unit 10 is stabilized.

The shaft 12 protrudes upwardly above the rotor holder 13. Also, the chucking device 30 is affixed, above the rotor holder 13, to the shaft 12 so as to allow the disc (not illustrated in FIG. 1) to be attached thereto and removed therefrom. The chucking device 30 includes therein: an attracting magnet 40 for attracting a clamp material (not illustrated in FIG. 1) which gives pressure to the disc from thereabove; and a yoke material 41 for strengthening the attracting magnet 40.

Overall Structure of Chucking Device

Figure 2:
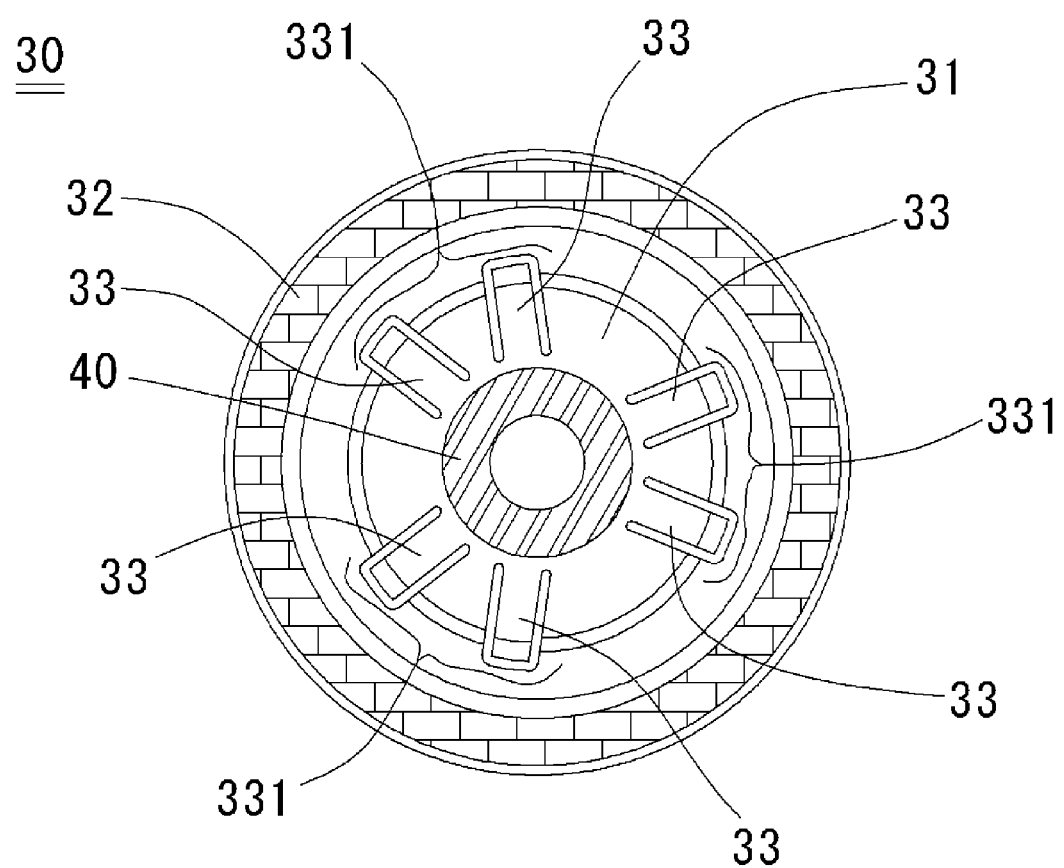
FIG. 2 is a plan view schematically illustrating an example of the embodiment of the chucking device of the present invention, as viewed from above.
Figure 3:
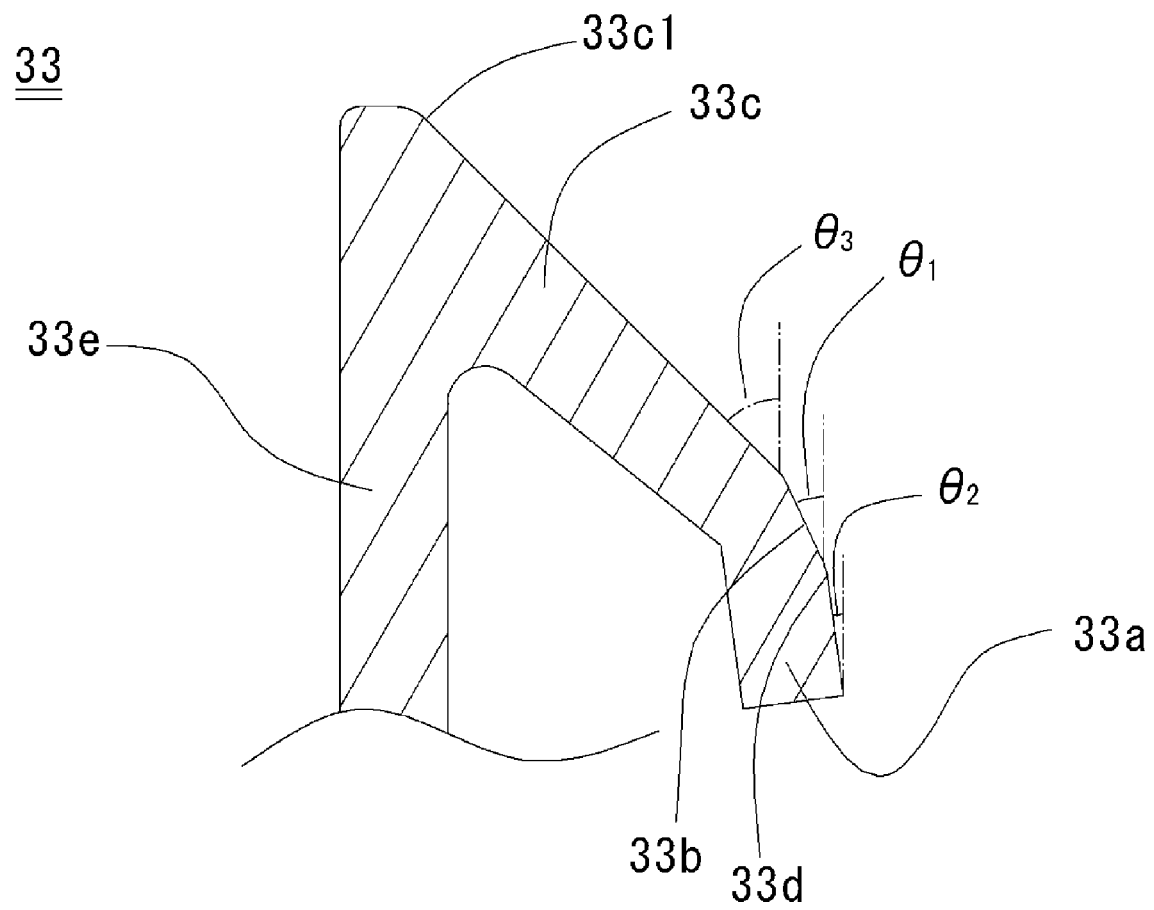
FIG. 3 is a diagram illustrating an enlarged view of an aligning claw from the exemplary cross section, with respect to a rotation axis, of the chucking device illustrated in FIG. 2.
Figure 4:
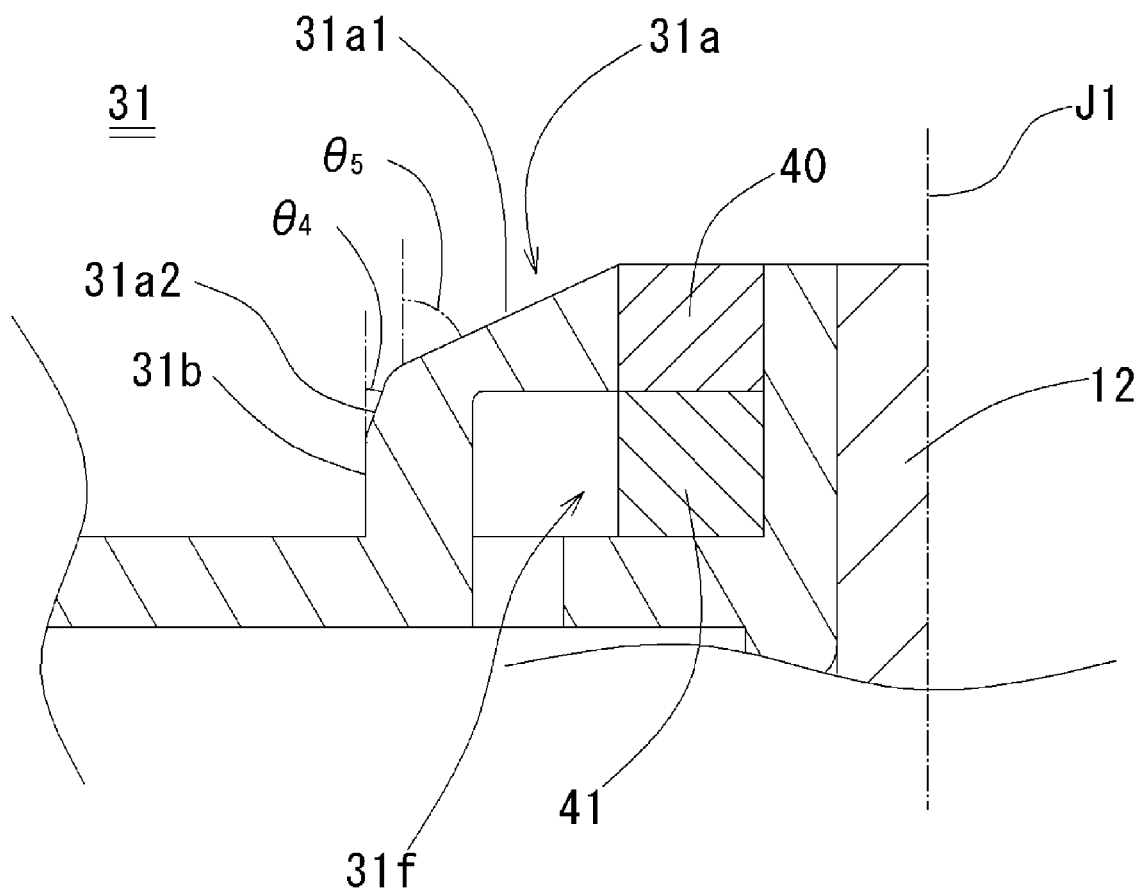
FIG. 4 is a diagram solely illustrating an enlarged view of a centering case section from the exemplary cross section, with respect to a rotation axis, of the chucking device illustrated in FIG. 2.
Figure 5:
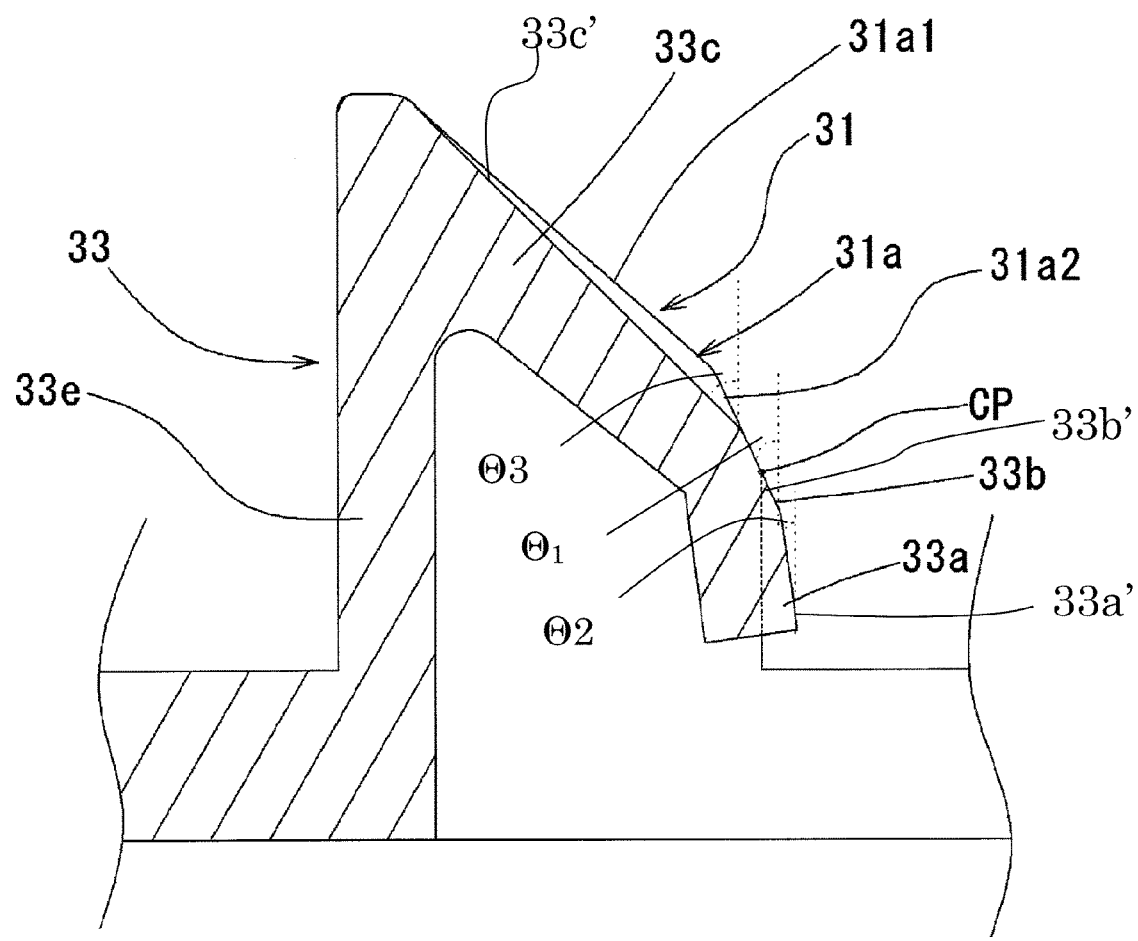
FIG. 5 is a diagram of an exemplary cross section of the chucking device illustrated in FIG. 2 illustrating relative positions of the centering case section and the aligning claw.
Figure 6A:
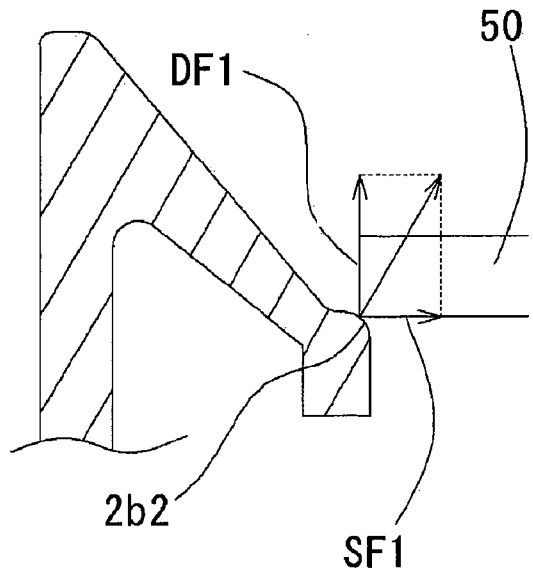
FIG. 6a is a diagram illustrating components of a force generated when a disc makes contact with a guiding section according to a conventional aligning claw.
Figure 6B:
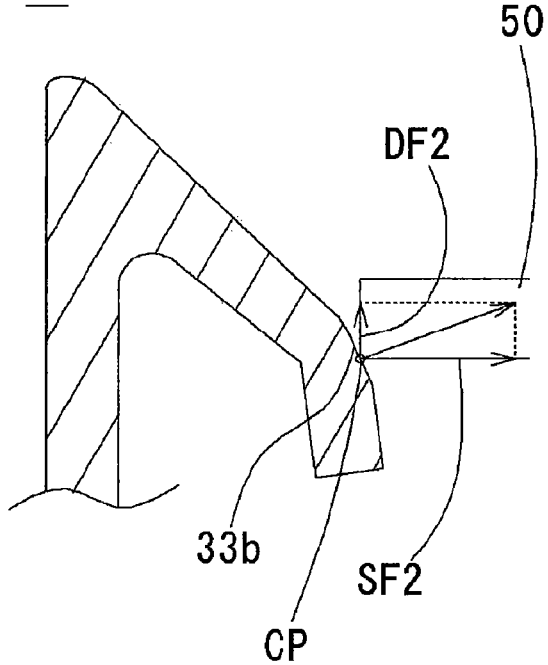
FIG. 6b is a diagram illustrating components of a force generated when a disc makes contact with a guiding section according to the aligning claw of the present invention.
Figure 7:
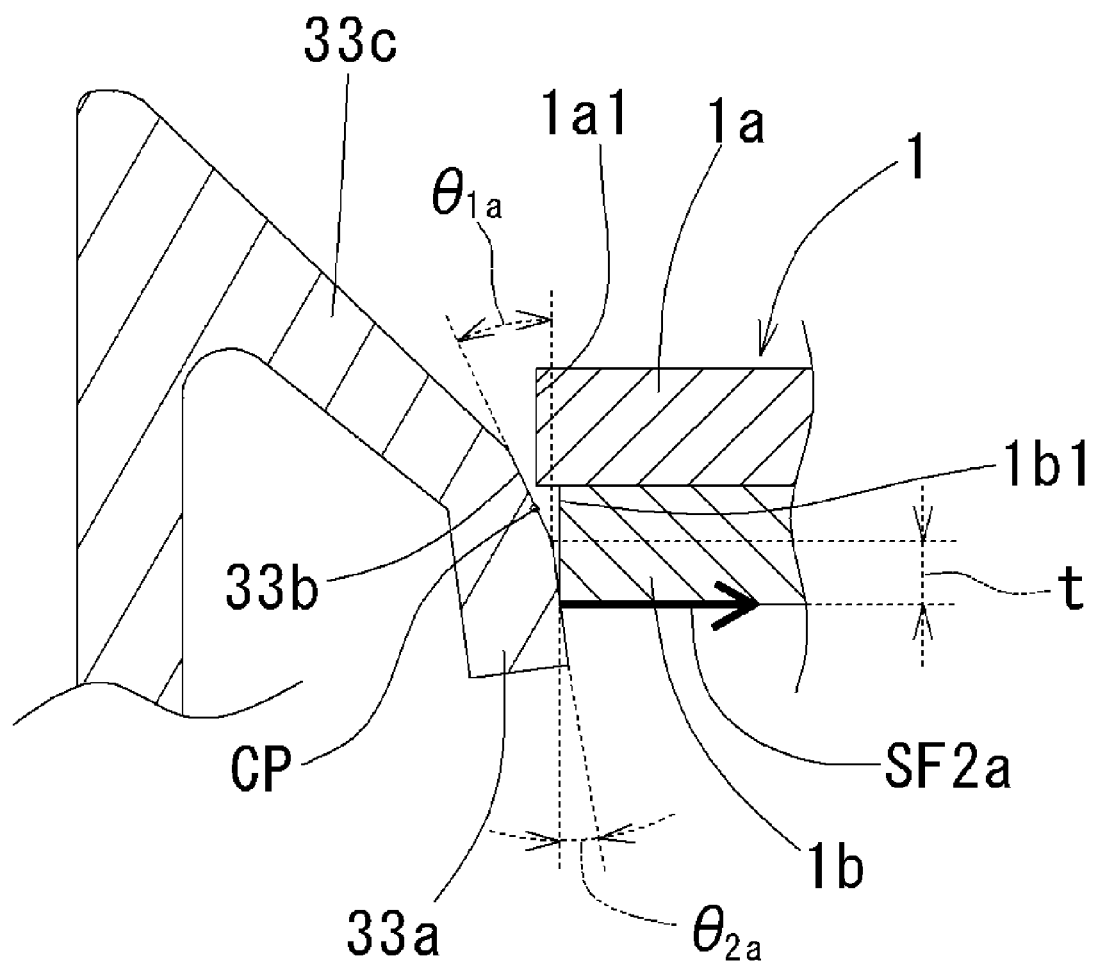
FIG. 7 is a diagram illustrating an exemplary cross section, with respect to the rotation axis, of the chucking device of the present invention when a multilayer disc is loaded thereon.

Next, details of the chucking device of the present invention will be described with reference to FIGS. 2 through 8. FIG. 2 is a plan view schematically illustrating an example of the embodiment of the chucking device of the present invention, as viewed from above. FIG. 3 is a diagram illustrating an enlarged view of an aligning claw from the exemplary cross section, with respect to a rotation axis, of the chucking device illustrated in FIG. 2. FIG. 4 is a diagram solely illustrating an enlarged view of a centering case section from the exemplary cross section, with respect to a rotation axis, of the chucking device illustrated in FIG. 2. FIG. 5 is a diagram of an exemplary cross section of the chucking device illustrated in FIG. 2 illustrating relative positions of the centering case section and the aligning claw. FIG. 6a is a diagram illustrating components of a force generated when a disc makes contact with a guiding section according to a conventional aligning claw. FIG. 6b is a diagram illustrating components of a force generated when a disc makes contact with a guiding section according to the aligning claw of the present invention. FIG. 7 is a diagram illustrating an exemplary cross section, with respect to the rotation axis, of the chucking device of the present invention when a multilayer disc is loaded thereon.

According to FIG. 2, the chucking device 30 comprises: at a center thereof a substantially cylinder shaped centering case section 31 for inserting through the central opening space of the disc (not illustrated in FIG.); a loading section 32, which is provided radially toward the outside of the centering case section 31, and onto which the disc is loaded; and a plurality (6 according to the present embodiment) of aligning claws 33, which are provided from an upper surface of and along a side of the centering case section 31. The aligning claws 33 are provided in such manner in which two aligning claws, making a pair thereof (hereinafter, referred to as pair of aligning claws 331), having a small space therebetween, are provided circumferentially, wherein a space between each pair of aligning claws 331 is larger than the aforementioned space. Each aligning claw 33 is positioned circumferentially and 120 degrees apart from another.

Further, the centering case section 31 and the aligning claw 33 of the chucking device 30 are conjointly molded as phenolic resin product. Materials for the resins are composite materials (e.g., polycarbonate (PC), poly phenylene sulfide (PPS), polyacetal (POM), etc.).

According to FIG. 3, the aligning claw 33 includes: a retainer section 33a for making contact with a lower end of an inner surface of the central opening space of the disc (not illustrated in FIG. 3) so as to generate a force, acting radially outward, to retain the disc; a guiding section 33b, provided axially above the retainer section 33a, for guiding the disc to the retainer section 33a; and a supporter section 33c, provided axially above the guiding section 33b, for supporting the retainer section 33a and the guiding section 33b.

An exterior of the retainer section 33a and that of the guiding section 33b form an inclined surface extending outwardly toward a bottom of the chucking device. A retainer section side angle of inclination $\theta_2$, which is an acute angle generated by the rotation axis J1 and the inclined surface of the retainer section 33a, and a guiding section side angle of inclination $\theta_1$, which is an acute angle generated by the rotation axis J1 and the inclined surface of the guiding section 33b, are such that $\theta_2 < \theta_1$.

Further, at a section bordering the retainer section 33a and the guiding section 33b, an inclined section 33d, which is a surface protruding radially outward, is provided. Due to the inclined section 33d, the chucking device becomes able to guide the disc from the guiding section 33b to the retainer section 33a, thereby reducing the disc loading force.

An exterior of the supporter section 33c forms an inclined surface protruding outwardly in a radial manner and extending downwardly in an axial manner. Further, a supporter section side angle of inclination $\theta_3$, which is an acute angle generated by the rotation axis J1 and the inclined surface of the supporter section 33c, and the guiding section side angle of inclination $\theta_1$ are such that $\theta_1 < \theta_3$. Furthermore, an elastic bend fulcrum section 33c1, which is provided at a topmost point of the supporter section 33c axially (e.g., at a radially innermost point thereof), as a fulcrum for causing the supporter section 33c to elastically bend both axially downward and radially inward when the disc makes contact with the aligning claw 33. A connection section 33e is provided axially downward from a top of the elastic bend fulcrum section 33c1 so as to connect the elastic bend fulcrum section 33c1 and the centering case section 31.

An exterior of the guiding section 33b has applied thereon a lapping or a polishing process, thereby improving sliding performance thereof and allowing the disc to smoothly be guided thereupon. Consequently, the disc loading force will be reduced. To be more specific, roughness of the exterior of guiding section 33b is, preferably, Ry≦6.4 μm (preferably, Ry≦1.0 μm).

According to FIG. 4, the centering section 31 includes an inclined guiding surface 31a for guiding the disc (not illustrated in FIG. 4) to the disc loading section 32 (not illustrated in FIG. 4). A cylinder section 31b is provided axially below the inclined guiding surface 31a. Further, radially inside the inclined guiding surface 31 and the cylinder section 31b, a ring shaped concaved containing section 31f is provided so as to contain the attracting magnet 40 and the yoke material 41.

The inclined guiding surface 31a includes an inclined surface having two angles of inclination positioned axially one over the other, wherein each angle of inclination having a different angle, with respect to the rotation axis, from the other. An inclined surface for one of the angles of inclination located axially above the other angle of inclination will be referred to as an upper inclined guiding surface 31a1, and an inclined surface for the other angle of inclination will be referred to as a lower inclined guiding surface 31a2. Here, an upper guiding side angle of inclination $\theta_5$, which is an acute angle generated by the rotation axis J1 and the upper inclined guiding surface 31a1, and a lower angle of inclination $\theta_4$, which is an acute angle generated by the rotation axis J1 and the lower inclined guiding surface 31a2 are such that $\theta_4 < \theta_5$.

Also, an exterior of the inclined guiding surface 31a has applied thereon the lapping or the polishing process, thereby improving sliding performance thereof and allowing the disc to smoothly be guided thereupon. Consequently, the disc loading force will be reduced. To be more specific, roughness of the exterior of the inclined guiding surface 31a is, preferably, Ry≦6.4 μm (preferably, Ry≦1.0 μm).

According to FIG. 5, the aligning claw 33, which extends from near a center of the guiding section 33b, protrudes radially further than the exterior of the centering case section 31. Therefore, the disc (not illustrated in FIG. 5) makes contact with a point of the guiding section 33b near the center of the centering case section 31 (hereinafter, the point at which the disc and the guiding section 33b meet will be referred to as a contact point "CP"). Also, an axially lower end of the inclined guiding surface 31a2 and an axially upper end of the guiding section 33b axially overlap with one another. A size of the lower inclined guiding surface angle of inclination $\theta_4$, which is an angle of inclination of the lower inclined guiding surface 31a2, and a size of the guiding section side angle of inclination $\theta_1$, which is an angle of inclination of the guiding section 31a are substantially equal with one another. Therefore, the disc will be allowed, without any added disc loading force than the disc loading force already applied thereupon, to be transferred from the lower inclined guiding surface 31a2 to the guiding section 33b. An exterior of the supporter section 33c having a large angle of inclination makes no contact with the disc thereby preventing an increase of the disc loading force.

According to FIG. 6a, when the disc 50 makes contact with the conventional inclined guiding section 2b2 of the aligning claw 2b, the disc loading force DF1 will be increased. That is, when the contact is made between the conventional inclined guiding section 2b2 and the disc 50, the size of the acute angle generated between a tangent and a perpendicular line at the point of contact becomes large and therefore, a component of the disc loading force DF1 applied to the disc 50 in the axially upward direction becomes large. On the other hand, according to FIG. 6b, when the disc 50 makes contact with the guiding section 33b of the aligning claw 33 of the present invention, a smaller force is to be applied at a contact point of CP to the disc 50 from the aligning claw 33 compared with the conventional inclined guiding section due to that the guiding section side angle of inclination θ1 is smaller. Therefore, the aligning claw 33 of the present invention requires, compared with the conventional aligning claw 2b, smaller disc loading force when loading thereon the disc 50. The aligning claw 33 of the present invention generates, compared with the convention aligning claw 2b, a larger retaining force SF2, thereby properly aligning the disc 50.

The DF1, which is a component of force: generated when the disc 50 makes contact with the inclined guiding section 2b2 of the conventional aligning claw 2b; generated by a point of the inclined guiding section 2b2 making the contact with the disc; and applied upward in axial manner to the disc 50 illustrated in FIG. 6a, will be, due to that an acute angle of inclination generated by the rotation axis J1 and the inclined guiding section 2b2 is greater than the guiding section side angle of inclination θ1, greater than the DF2, which is a component of force: generated when the disc 50 makes contact with the guiding section 33b of the aligning claw 33 of the present invention; applied at the contact point CP between the guiding section 33b and the disc; and applied upward in axial manner to the disc 50 illustrated in FIG. 6b. Therefore, the DF1 and DF2 are such that DF1>DF2. Thus, the aligning claw 33 of the present invention requires, compared with the conventional aligning claw 2b, a smaller disc loading force to load the disc 50. Further, the aligning claw 33 of the present invention generates, compared with the conventional aligning claw 2b, the retaining force SF2 which is greater than the SF1. Due to the SF1, the disc 50 will be aligned efficiently.

With reference to FIG. 7, a situation in which the multilayer disc 1 is loaded on the chucking device 30 of the present invention will be described.

The disc 1b, which is a disc facing the loading section 32, of the multilayer disc 1 makes contact with the contact point CP of the guiding section 33b and will be guided to the retainer section 33a. Only a point at the lower end of the central opening space 1b1 of the disc 1b makes contact with the retainer section 33a due to the retainer section side angle of inclination θ2 the retainer section 33a. Then, a restoring force, which is generated by the aligning claws 33 elastically bending radially inward due to the contact between the multilayer disc 1 and the retainer section 33a, and applied radially outward to the disc 1b, becomes a retaining force SF2. Since the retainer section 33a is tilted, an extent to which the aligning claw is forced to bend becomes great, wherein the force bending the aligning claw is in proportion to the restoring force SF2a. Consequently, the multilayer disc 1 will be accurately aligned with the chucking device.

A central opening space 1a1 of the disc 1a makes no contact with the aligning claw 33 (e.g., aligning claw 33 aligns the multilayer disc 1 with the chucking device by making contact solely with the disc 1b). While the multilayer disc 1 remains loaded on the loading section 32, the guiding section 33b and an inner surface of the central opening space 1a1 of the disc 1a are positioned near one another having a slight space therebetween in a radial manner. A situation in which a maximum misalignment occurs between the central opening space 1b1 of the disc 1b and the central opening space 1a1 of the disc 1a is when disc 1a and 1b are misaligned from each other by, in total, 0.15 mm in opposite directions while vertical thickness of each of the discs 1a and 1b is 0.6 mm. Since the retainer section 33a will be elastically bent inward in the radial direction due to the contact between the retainer section 33a and the multilayer disc 1, the guiding section side angle of inclination θ1 is to be small. Hereafter, the angle of the guiding section side angle of inclination while the multilayer disc 1 remains loaded on the loading section 32 is to be θ1a. Also, the angle of the retainer section side angle of inclination while the multilayer disc 1 remains loaded on the loading section 32 is to be θ2a. A distance between a contact point of the disc 1b and the retainer section 33a, and an apex of the inclined section 33d is to be t (mm). A minimum angle for the guiding section side angle of inclination θ1a, such that the guiding section 33b cannot make contact with the central opening space 1b1 of the disc 1b, can be calculated by using a following equation; $\theta_{1a} = \tan^{-1}\{(0.15 - t \times \tan\theta_{2a})/(0.6 - t)\}$. Therefore, the guiding section side angle of inclination θ1a is to be, preferably, greater than the value calculated by using the above equation. Further, since the size of the disc loading force DF2 is to be preferably smaller than the size of the retaining force SF2, a maximum guiding section side angle of inclination θ1a is to be approximately 45° such that the size of the disc loading section DF2 and the size of the disc retaining force SF2 become substantially equal to one another. Therefore, the guiding section side angle of inclination θ1a is to be preferably smaller than 45°. The lower side angle of inclination θ4 of the lower inclined guiding surface 31a2 in the inclined guiding surface 31b of the centering case section 31 can also be made such that it is greater than the value calculated by using the above equation and smaller than 45°. Therefore, the lower inclined guiding surface 31a2 makes contact solely with the disc 1b and guides the multilayer disc 1 to the guiding section 32. While the multilayer disc remains loaded on the loading section 32, the lower inclined guiding surface 31a2 radially overlaps with disc 1a. The exterior of the lower inclined guiding surface 31a2 faces the internal surface of the central opening space 1a1 of the disc 1a, wherein there is a slight space therebetween.

Figure 8:
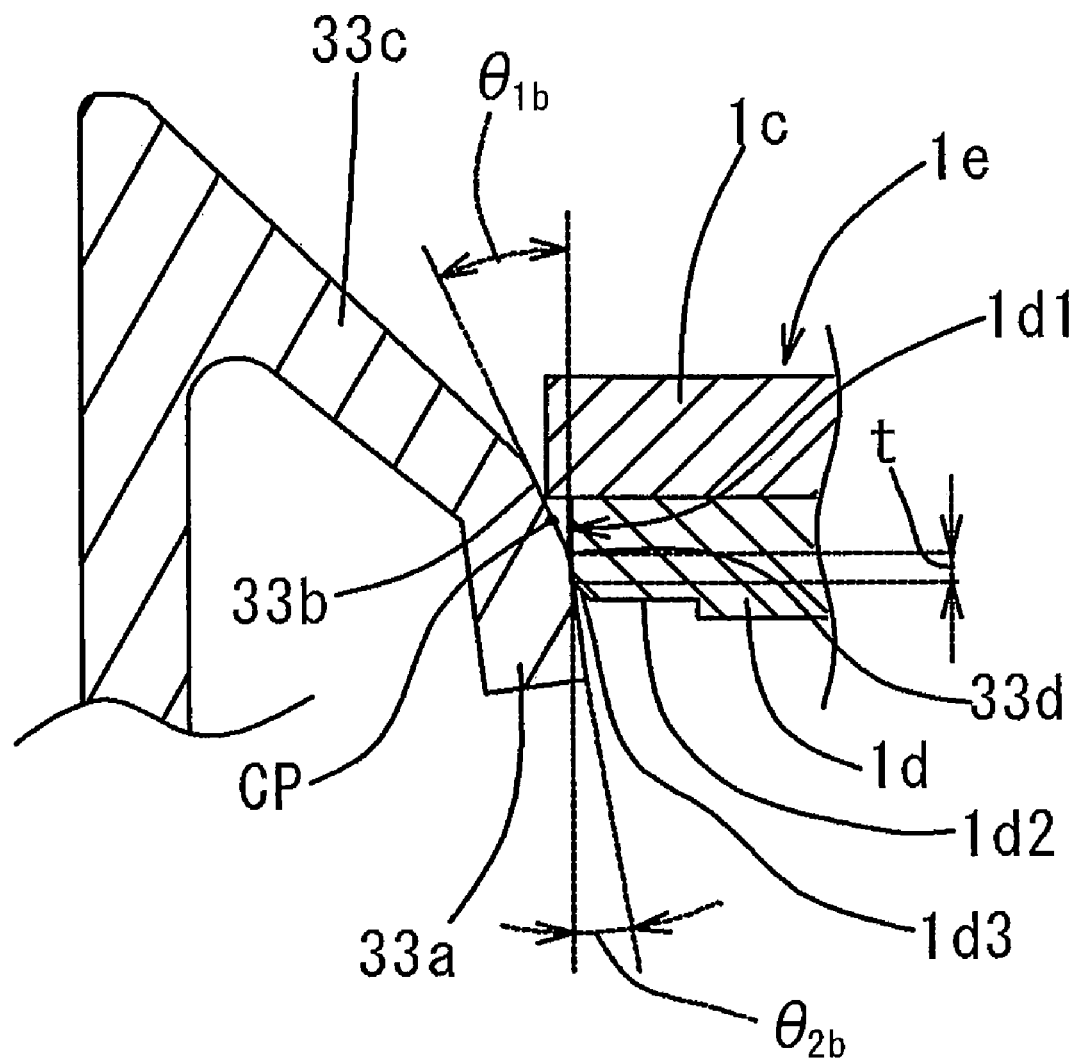
FIG. 8 is a diagram illustrating an exemplary cross section, with respect to the rotation axis, of the chucking device of the present invention when a multilayer disc having, on a surface thereof facing the loading section, a leveled section and a chamfered section.

With reference to FIG. 8, a function played by the aligning claw 33 when a multilayer disc 1e which is comprised of an upper side disc 1c and a lower side disc 1d wherein: the upper side disc 1c and the lower side disc 1d are misaligned from one another; a leveled section 1d2 is provided on a downward facing surface of the disc 1d; and a chamfered section 1d3 is provided at the low end of the central opening space 1d1, will be described. Note that at the leveled section 1d2, the disc 1d is thinner compared with the rest of the disc 1d.

The leveled section 1d2 provided on the downward facing surface of the disc 1d is, approximately, 0.1 mm in thickness, whereas the chamfering section 1d3 is C0.1 in thickness. That is to say, the chamfering section 1d3 is, approximately, 0.1 mm in thickness. Therefore, in case when the leveled section 1d2 and the chamfering section 1d3 are provided, the disc 1d makes contact with the aligning claw 33 at a point 0.2 mm higher than a point at which the disc 1d and the aligning claw 33 are to make contact if not for the leveled section 1d2 and the chamfering section 1d3. Since the retainer section 33a will be elastically bent inward in the radial direction due to the contact between the retainer section 33a and the multilayer disc 1e, the guiding section side angle of inclination θ1 is to be small. Hereafter, the angle of the guiding section side angle of inclination while the multilayer disc 1 remains loaded on the loading section 32 is to be θ1b. Also, the angle of the retainer section side angle of inclination while the multilayer disc 1 remains loaded on the loading section 32 is to be θ2b. A distance between a contact point of the disc 1d and the retainer section 33a, and an apex of the inclined section 33d is to be t (mm). When such disc 1d having the maximum misalignment is to be loaded, the minimum guiding section angle of inclination θ1b, such that the guiding section 33b cannot make contact with the disc 1C, is a value calculated by using a following equation; $\theta_{1b} = \tan^{-1}\{(0.15^{-t} \times \tan\theta_{2b})/(0.6 - 0.2 - t)\}$. Therefore, when the disc 1d having formed thereon the leveled section 1d2 and the chamfering section 1d3 is to be loaded, the guiding section side angle of inclination θ1b is preferably greater than the value calculated by using the above equation. Also, the lower side angle of inclination θ4 is to be, when the disc 1d having formed thereon the leveled section 1d2 and the chamfering section 1d3 is to be loaded, greater than the value calculated by using the above equation.

Figure 9:
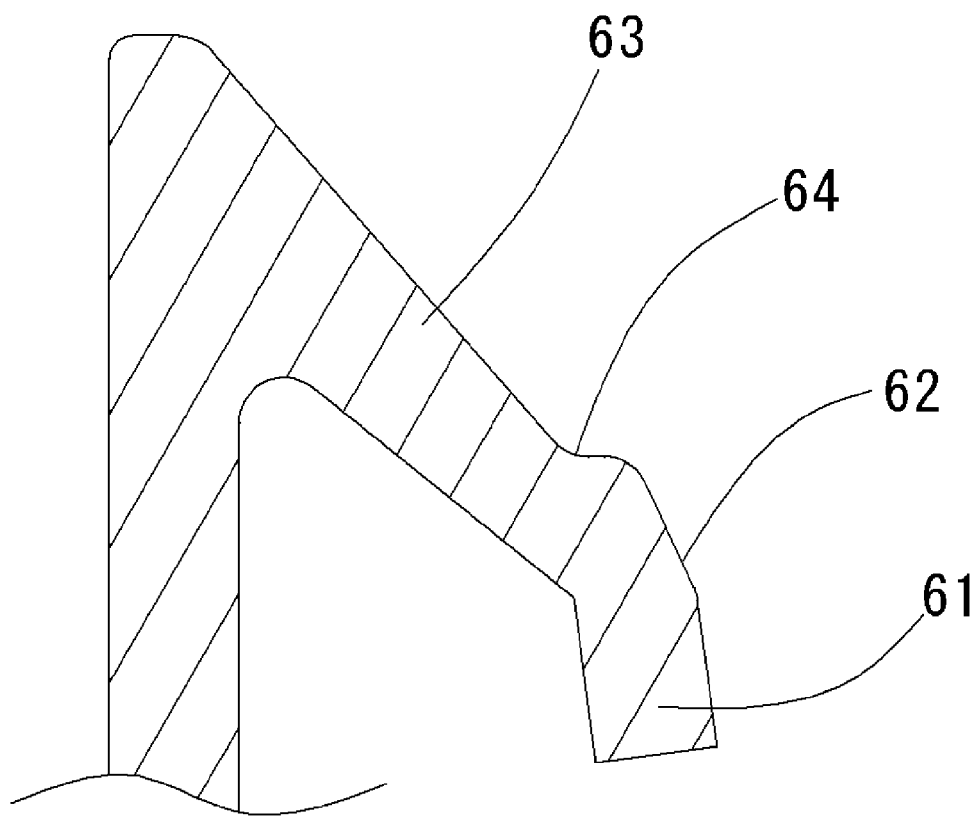
FIG. 9 is a diagram illustrating another embodiment of the aligning claw of the present invention.

With reference to FIG. 9, another embodiment of the aligning claw will be described.

The aligning claw 60 includes: a retainer section 61 for making contact with the disc (not illustrated in FIG. 9); a guiding section 62 for guiding the disc to the retainer section 61; and a supporter section 63 for supporting the retainer section 61 and the guiding section 62. At a section bordering an exterior of the supporter section 63 and an exterior of the guiding section 62, a concaved section 64 having an opening section facing outside. Due to the concaved section 64, the supporter section 63, the guiding section 62 and the retainer section 61 can be designed individually. That is to say that an angle of inclination and a length of an inclined surface for each of the supporter section 63, the guiding section 62 and the retainer section 61 can be appropriately designed.

Disc Drive Device

Figure 10:
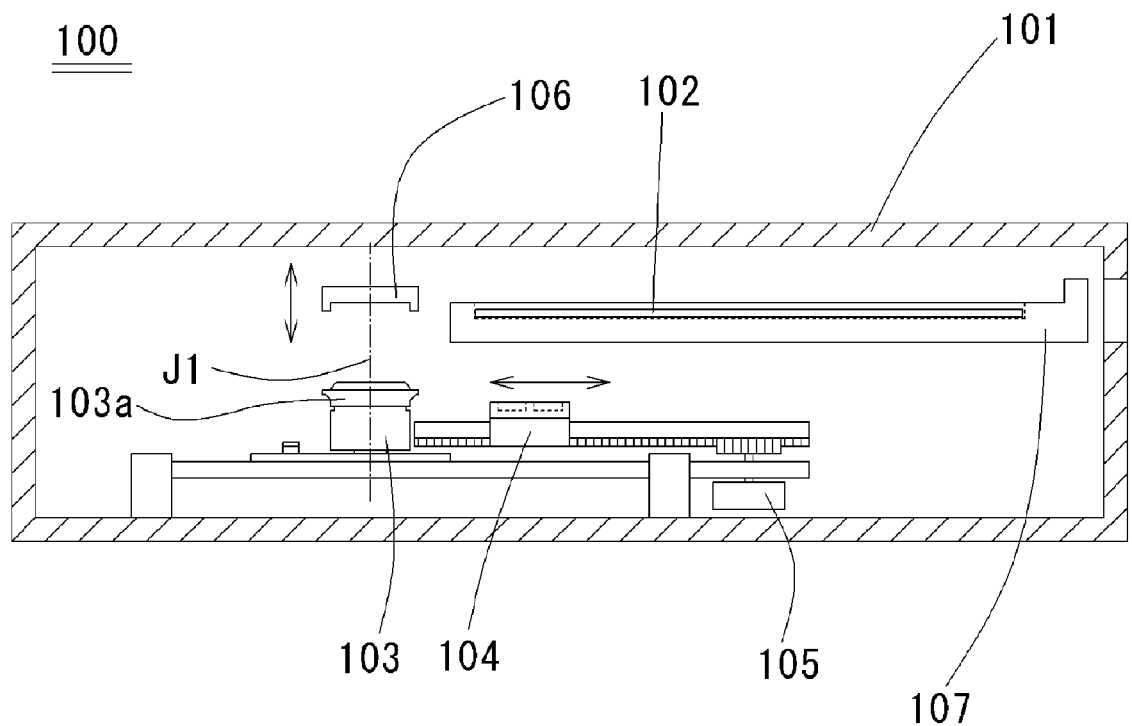
FIG. 10 is a diagram illustrating an exemplary cross section, with respect to the rotation axis, of an embodiment of a disc drive device of the present invention.
Figure 11:
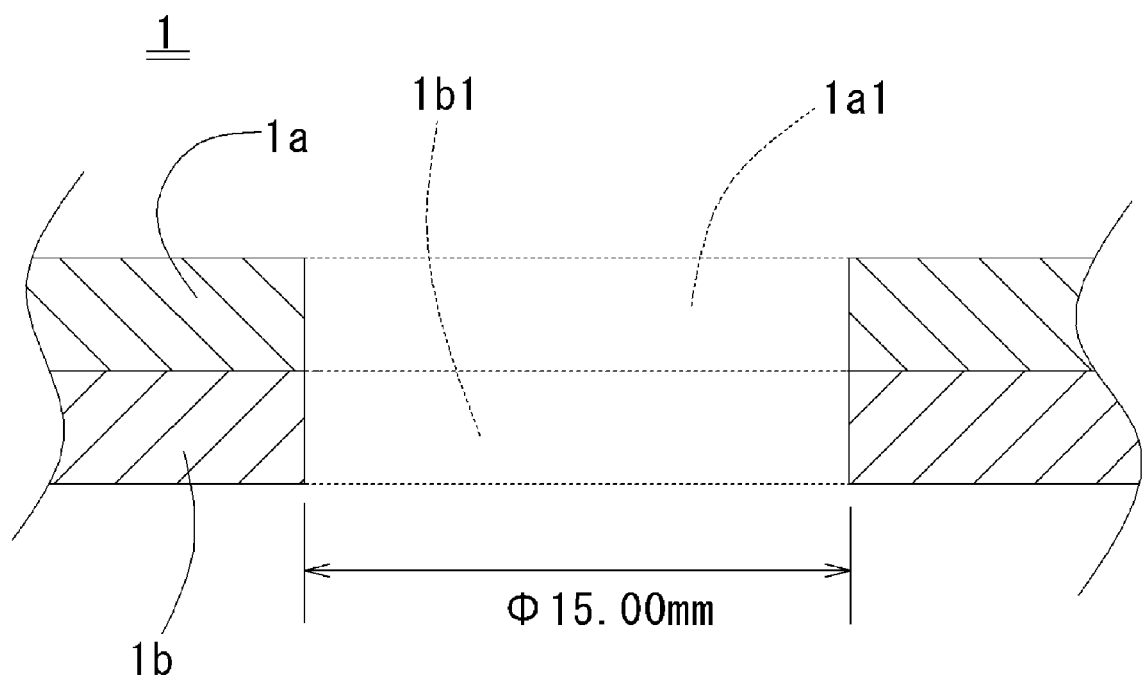
FIG. 11 is a diagram illustrating an exemplary cross section, with respect to the rotation axis, of a structure of the multilayer disc.
Figure 12:
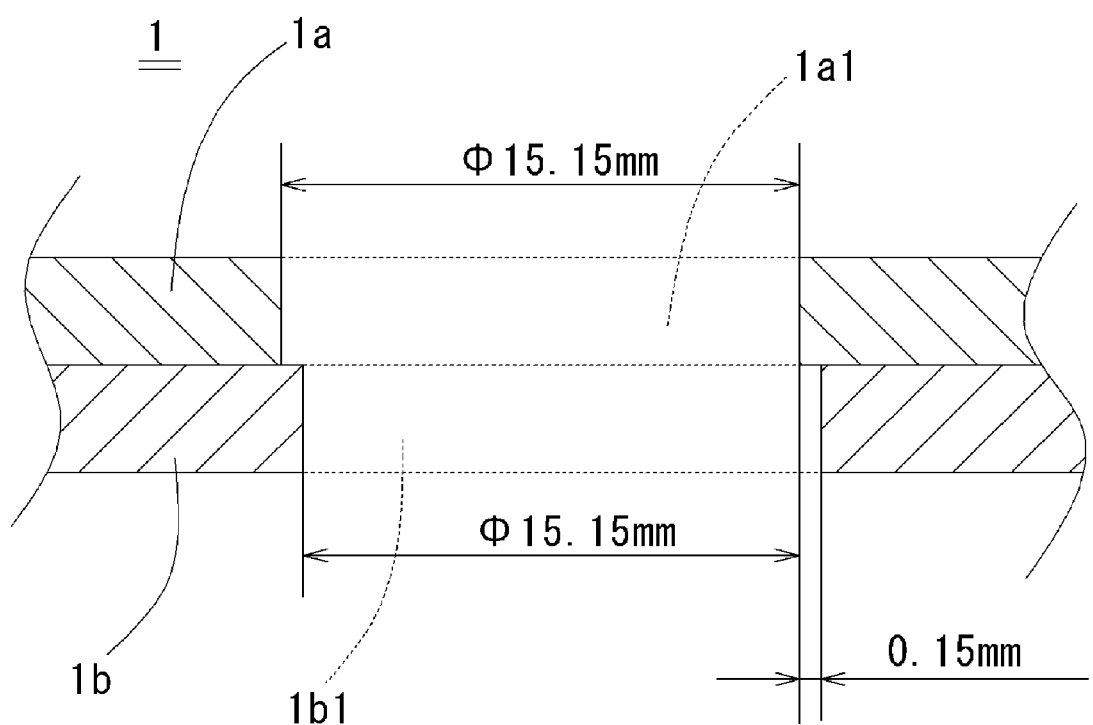
FIG. 12 is a diagram illustrating an exemplary cross section, with respect to the rotation axis, of a multilayer disc having occurred thereon maximum misalignment.
Figure 13:
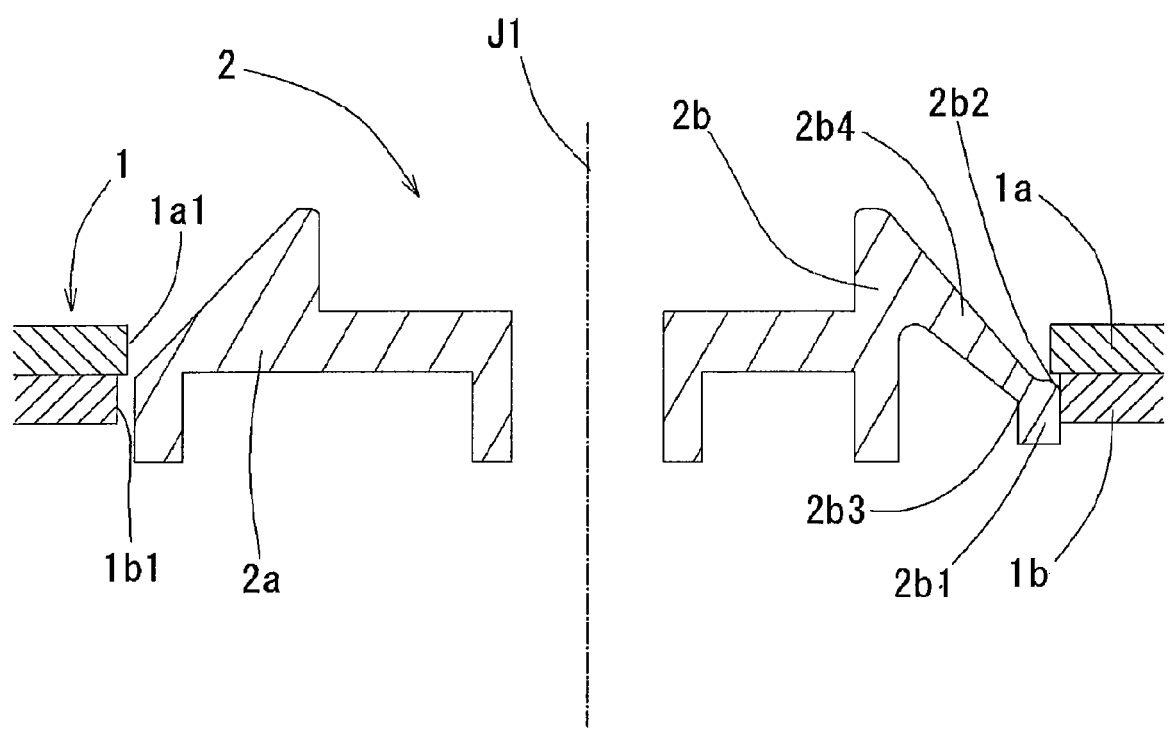
FIG. 13 is a diagram illustrating an exemplary cross section, with respect to the rotation axis, of a conventional chucking device.

An embodiment of a disc drive device of the present invention will be described with reference to FIG. 10. FIG. 10 is a diagram illustrating an exemplary cross section, with respect to the rotation axis, of an embodiment of a disc drive device of the present invention.

According to FIG. 10, a disc drive device 100 comprises: a case 101; a brushless motor 103, contained inside the case 101, for rotating toward a predetermined direction an attachable and removable disc 102; an optical pick up mechanism 104 for storing and reproducing information at a predetermined position in the disc 102; an optical pick up transport mechanism 105 for allowing the optical pick up mechanism 104 to transport in a vertical manner with respect to the rotation axis J1 of the brushless motor 103; a clamp mechanism 106 for retaining the disc 102 by putting pressure on the disc from above the disc; and a tray 107 for receiving and ejecting the disc 102.

The optical pick up mechanism 104 is a mechanism for, by using a laser beam, storing and reproducing information in the disc 102. The optical pick up mechanism 104 includes an optical system for leading a light source and the laser beam from the light source to the disc 102, and a light receiving element for receiving a light reflected off the disc 102.

The optical pick up transport mechanism 105 includes a train of gears connecting the optical pick up mechanism 104 and the optical pick up transport mechanism 105, and a motor for driving the train of gears.

The clamp mechanism 106 is located approximately at a same position as the rotation axis J1, and is operable to transport along the axis. When the disc 102 is loaded on the chucking device 103a of the brushless motor 103, then the disc 102 is aligned, and the clamp mechanism 106 is lowered axially. The clamp mechanism 106 gives pressure on the disc 102 applied axially from above the disc so as to retain the disc 102.

While the invention has been described with respect to preferred embodiment, the foregoing description is in all aspects illustrative and not restrictive. It is understood that the numerous other modifications and variations can be devised without departing from the scope of the invention.

What is claimed is:

1. A chucking device for allowing a disc having a central opening space so as to rotate around a predetermined rotation axis, or two of such discs pasted to one another, to be attached thereto and removed therefrom, the device comprising:
    a loading section for loading thereon the disc;
    a substantially cylinder shaped centering case section for inserting through the central opening space and loading thereon the disc; and
    an aligning claw for making contact with the disc, elastically bending in a radial manner and aligning a center of a rotation of the disc and the rotation axis, wherein:
    the aligning claw comprises
    a retainer section for making contact with an inner surface of the central opening space of the disc so as to align the disc with the chucking device and retain the disc, the retainer section having a first upper surface;
    a guiding section, located axially above the retainer section, for guiding the disc to the retainer section, the guiding section having a second upper surface; and
    a supporter section, for supporting the guiding section and the retainer, the supporter section having a third upper surface, wherein the first upper surface is extended radially outside from the second upper surface, wherein the second upper surface is extended radially outside from the third upper surface, wherein the first upper surface and the second upper surface extend downward, wherein the first upper surface forms an acute angle relative to the second upper surface, and the second upper surface forms an acute angle relative to the third upper surface.

2. The chucking device according to claim 1, wherein:
    the guiding section and the retainer section are provided conjointly; and
    an inclined surface protruding radially outward is provided to be a connection section so as to connect the guiding section to the retainer section.

3. The chucking device according to claim 1, wherein:
    the retainer section aligns the disc with the chucking device by making contact with a low end of the central opening space of the disc.

4. The chucking device according to claim 1, wherein while the disc remains loaded on the loading section, a degree of a guiding section side angle of inclination $\theta_{1a}$ which is an acute angle generated by the rotation axis and the second upper surface of the guiding section is smaller than 45°.

5. The chucking device according to claim 1, wherein:
    the disc comprises an upper side disc and a lower side disc;
    the aligning claw makes contact solely with the lower side disc; and
    while the disc remains loaded on the loading section, the upper side disc makes no contact with the guiding section.

6. The chucking device according to claim 1, wherein a restoring force which is generated by the aligning claw elastically bent inward when the central opening space makes contact therewith and is applied radially outward is greater than a disc loading force which is required when loading the disc axially on the loading section.

7. The chucking device according to claim 1, wherein a degree of a supporter section side angle of inclination $\theta_3$ which is an acute angle generated by the rotation axis and the third upper surface of the supporter section is different from a degree of the guiding section side angle of inclination $\theta_1$ which is an acute angle generated by the rotation axis and the second upper surface of the guiding section.

8. The chucking device according to claim 7, wherein the supporter section side angle of inclination $\theta_3$ is greater than the guiding section side angle of inclination $\theta_1$.

9. The chucking device according to claim 1, wherein:
    a degree of a guiding section side angle of inclination $\theta_1$ which is made between the second upper surface and the rotation axis is different from a degree of a retainer section side angle of inclination $\theta_2$ which is made between the first upper surface and the rotation axis.

10. The chucking device according to claim 9, wherein the guiding section side angle of inclination $\theta_1$ and the retainer section side angle of inclination $\theta_2$ are such that $\theta_2$ is smaller than $\theta_1$.

11. A chucking device for allowing a disc having a central opening space so as to rotate around a predetermined rotation axis, or two of such discs pasted to one another, to be attached thereto and removed therefrom, the device comprising:
    a loading section for loading thereon the disc;
    a substantially cylinder shaped centering case section for inserting through the central opening space and loading thereon the disc; and
    an aligning claw for making contact with the disc, elastically bending in a radial manner and aligning a center of a rotation of the disc and the rotation axis, wherein:
    the aligning claw comprises
    a retainer section for making contact with an inner surface of the central opening space of the disc so as to align the disc with the chucking device and retain the disc;
    a guiding section, located axially above the retainer section, for guiding the disc to the retainer section; and
    a supporter section, for supporting for supporting the guiding section and the section, wherein:
    the centering case section includes an inclined guiding surface for guiding the disc, at least, to the guiding section; and a low end of the inclined guiding surface overlaps with the guiding section radially.

12. The chucking device according to claim 11, wherein the inclined guiding surface includes 2 separate inclined surfaces each having an angle of inclination which is an acute angle generated by the rotation axis and the inclined guiding surface.

13. The chucking device according to claim 12, wherein:
the inclined guiding surface includes
an upper inclined guiding surface having an upper angle of inclination $\theta_5$ which is an acute angle generated by the rotation axis and the upper inclined guiding surface; and
a lower inclined guiding surface having a lower angle of inclination $\theta_4$ which is an acute angle generated by the rotation axis and the lower inclined guiding surface, wherein:
the upper angle of inclination $\theta_5$ and the lower angle of inclination $\theta_4$ are such that $\theta_4$ is smaller than $\theta_5$.

14. The chucking device according to claim 13, wherein while the disc remains loaded on the loading section, the lower side angle of inclination $\theta_4$ is smaller than, approximately, 45°.

15. The chucking device according to claim 13, wherein at least a small part of the lower side inclined guiding surface overlaps with the guiding section in a radial manner.

16. The chucking device according to claim 13, wherein a section bordering the guiding section and the supporter section is provided either at a radially same position as, or at a radially inward position of the lower inclined guiding surface.

17. The chucking device according to claim 11, wherein:
the guiding section and the retainer section each have an inclined surface which is inclined with respect to the rotation axis; and
a degree of a guiding section side angle of inclination $\theta_1$ which is an acute angle generated by the rotation axis and the guiding section is different from a degree of a retainer section side angle of inclination $\theta_2$ which is an acute angle generated by the rotation axis and the retainer section.

18. The chucking device according to claim 17, wherein the guiding section side angle of inclination $\theta_1$ and the retainer section side angle of inclination $\theta_2$ are such that $\theta_2$ is smaller than $\theta_1$.

19. The chucking device according to claim 11, wherein roughness of at least the guiding section and the inclined guiding surface is, approximately, $Ry \leq 6.4$ μm.

20. A brushless motor having installed therein the chucking device according to claim 11, comprising:
a rotor unit having installed therein a rotor magnet for rotating around the rotation axis and for affixing the chucking device therein; and
a stator unit having therein a stator having a surface facing the rotor magnet.

21. A disc drive device having installed therein the brushless motor according to claim 20, comprising:
a clamp mechanism for retaining the disc by putting pressure on the disc from thereabove;
a pick up mechanism for storing data on the disc and reproducing data stored on the disc;
a pick up transport mechanism for allowing the pick up mechanism to be transported; and
a case for containing the clamp mechanism, the pick up mechanism and the pick up transport mechanism.

* * * * *